H. D. MURRAY.
FRICTION CLUTCH.
APPLICATION FILED OCT. 4, 1911.
1,064,242.
Patented June 10, 1913.
2 SHEETS—SHEET 2.
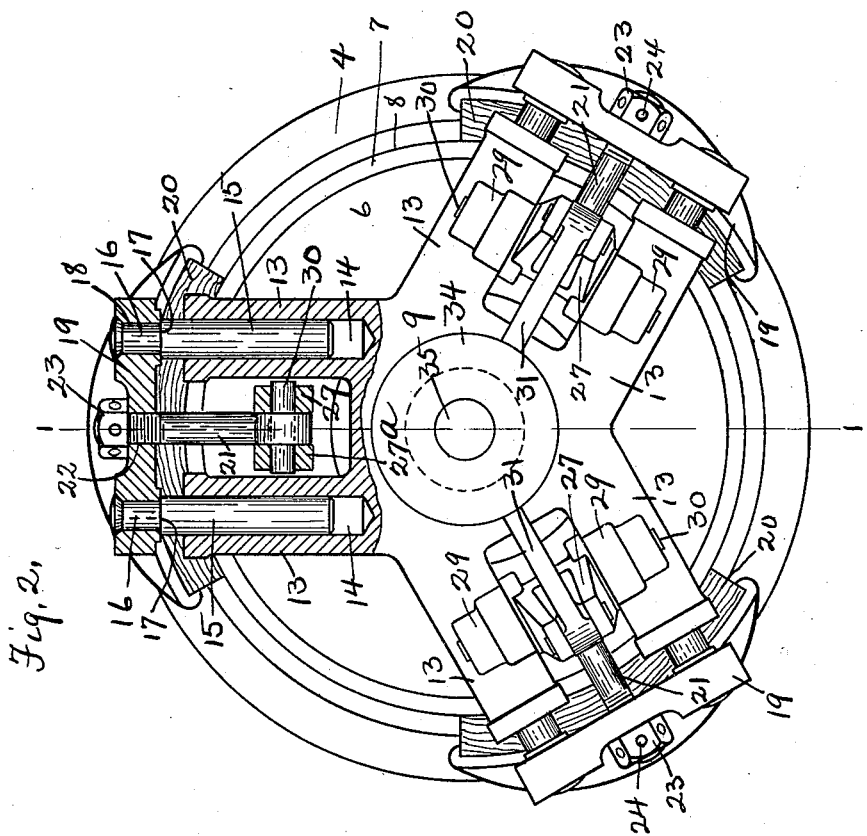

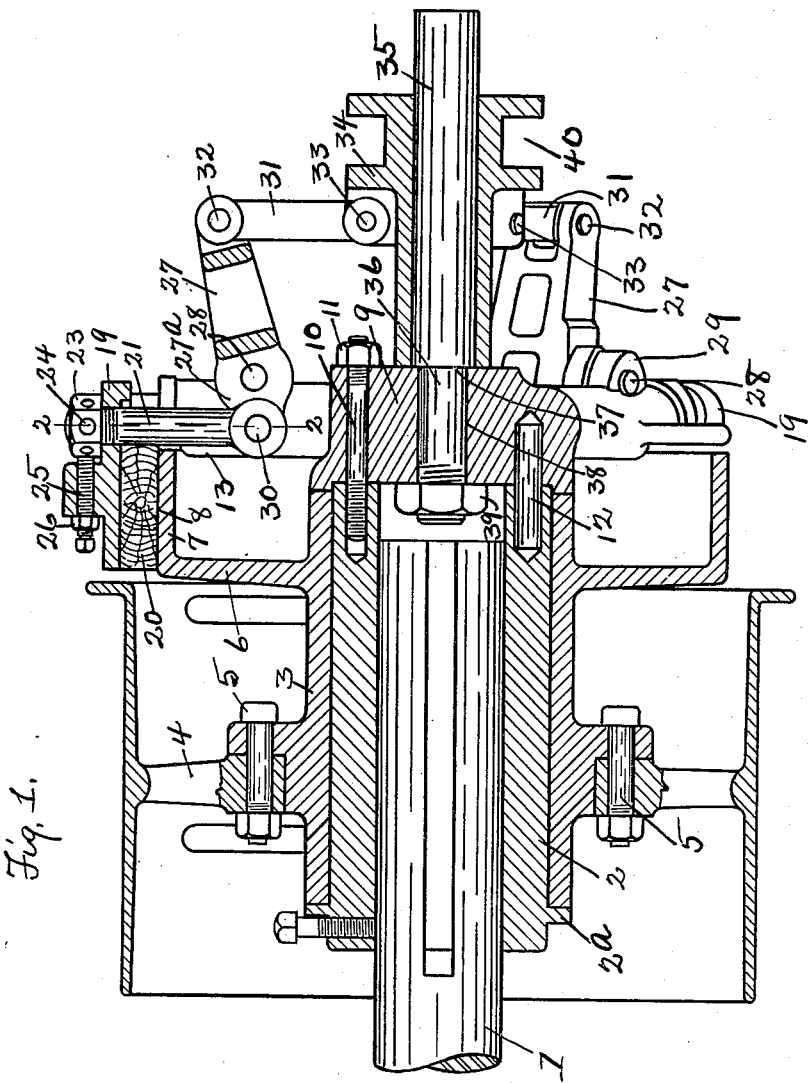

UNITED STATES PATENT OFFICE.

HARRY D. MURRAY, OF GROVE CITY, PENNSYLVANIA, ASSIGNOR TO THE BESSEMER GAS ENGINE COMPANY, OF GROVE CITY, PENNSYLVANIA, A CORPORATION OF PENNSYLVANIA.

FRICTION-CLUTCH.

1,064,242. Specification of Letters Patent. Patented June 10, 1913.

Application filed October 4, 1911. Serial No. 652,813.

*To all whom it may concern:*

Be it known that I, HARRY D. MURRAY, a citizen of the United States, residing at Grove City, in the county of Mercer and State of Pennsylvania, have invented new and useful Improvements in Friction-Clutches, of which the following is a specification.

This invention relates to friction clutches, and consists in certain improvements in the construction thereof as will be hereinafter fully described and pointed out in the claim.

More particularly, the invention relates to the manner of mounting and operating the shoes forming one of the friction members.

The invention is illustrated in the accompanying drawings as follows:—

Figure 1 is a section on the line 1—1 in Fig. 2. Fig. 2 an end elevation, partly in section on the line 2—2 in Fig. 1.

1 marks the driving shaft, 2 the driving sleeve fixed on the driving shaft, 3 the driven member which is journaled on the sleeve 2, 4 a pulley secured to the driven member by the bolts 5, 6 an annular web extending from the driven member 3 and carrying the friction flange 7 on which is the annular friction surface 8. The driven member 3 is locked against axial movement on the sleeve 2 by the shoulder 2ª on the sleeve 2 and the hub of the shoe carrier 9. The carrier 9 is secured to the end of the sleeve 2 by means of studs 10, these studs being provided with the nuts 11 for clamping the carrier 9 on the end of the sleeve. Pins 12 are also provided to assist in locking the carrier against rotation relatively to the sleeve.

Parallel arms 13 extend outwardly from the hub, the arms being each side of a radial line. Each arm is provided with a socket 14 in which a guide pin 15 is slidingly mounted. The guide pins are reduced at their ends 16 forming shoulders 17. The reduced ends 16 extend through perforations 18 in the shoe plates 19, and the pins are headed over on the shoe plates so as to firmly secure the pins in the shoe plates. The shoes, preferably of wooden blocks, 20 are carried by the shoe plates 19 operating on the friction surface 8.

The pins 15 form a very cheap and at the same time very strong and efficient mounting for the shoes. This is particularly desirable in that the shoes are off-set or extend to the side of the actuating mechanism so that it is necessary to have a close fitting yet a freely moving actuating mechanism to prevent binding of the parts. The parallel arms 13 with a space between them not only provide a desirable mounting for the shoe but allow a centrally located shoe actuating mechanism to be arranged in the space.

The eye bolt 21 extends through the perforation 22 in the shoe plate 19, and an adjusting nut 23 is arranged on the outer end of the bolt. The faces of the nut are provided with the detents 24 which may be engaged by a screw 25. The screw extends in an axial direction through the shoe plate and is locked in adjustment by a jam nut 26. This arrangement of the locking screw 25 gets it out of the way. This is desirable in a rotating device of this type.

Setting levers 27 are mounted on the pins 28. The pins 28 extend into the ears or lugs 29 on the face of the arms 13. The eye bolts 21 extend between the forked ends 27ª of the levers and are pivotally secured thereto by the pins 30. Links 31 are connected to the outer ends of the levers 27 by the pins 32 and to a sliding collar 34 which is slidingly mounted on the shaft3 5. The shaft 35 has a reduced portion 36 forming a shoulder 37. The reduced portion extends through a perforation 38 arranged in the center of the carrier 9 and is provided with a nut 39 on its inner end by means of which it is secured in place in the carrier. The sliding collar 34 has the usual groove 40 to which the shifting mechanism of the clutch is attached.

To throw in the clutch, the sliding collar 34 is moved to the position shown in Fig. 1 wherein the links are brought to a position at right angles to the axis of the shaft 35. In this position, the links force the outer ends of the levers 27 away from the axis. This carries the inner ends of the levers 27 toward the axis of the carrier. This movement of the levers carries with them, the eye bolts 21 and shoes 19 with their friction blocks 20, thus setting the clutch. A reverse movement of the collar 34 releases the clutch.

It will be understood, of course, that while the shaft 1 is described as the driving element, and the sleeve 3 as the driven element, that these relations may be reversed.

What is claimed as new is:—

In a friction clutch, the combination of an exterior annular friction surface; a friction shoe operating upon said surface, a part of said shoe overhanging said surface; a shoe carrier having parallel arms extending therefrom arranged at the side of said friction surface; parallel guide pins mounted in the arms and forming a sliding driving connection between the arms and the shoe, said pins being connected with the overhanging portion of said shoe; and mechanism extending between the arms for actuating the shoe, comprising a lever pivotally mounted on said arms and having its operating end extending between the arms and a connection between the lever and the shoe.

In testimony whereof I have hereunto set my hand in the presence of two subscribing witnesses.

HARRY D. MURRAY.

Witnesses:
C. F. FITHIAN,
JOHN CARRUTHERS.

Copies of this patent may be obtained for five cents each, by addressing the "Commissioner of Patents, Washington, D. C."